March 21, 1950  A. G. ANDERSON  2,501,299
PANEL TRIMMING MACHINE
Filed Oct. 5, 1944  4 Sheets-Sheet 1
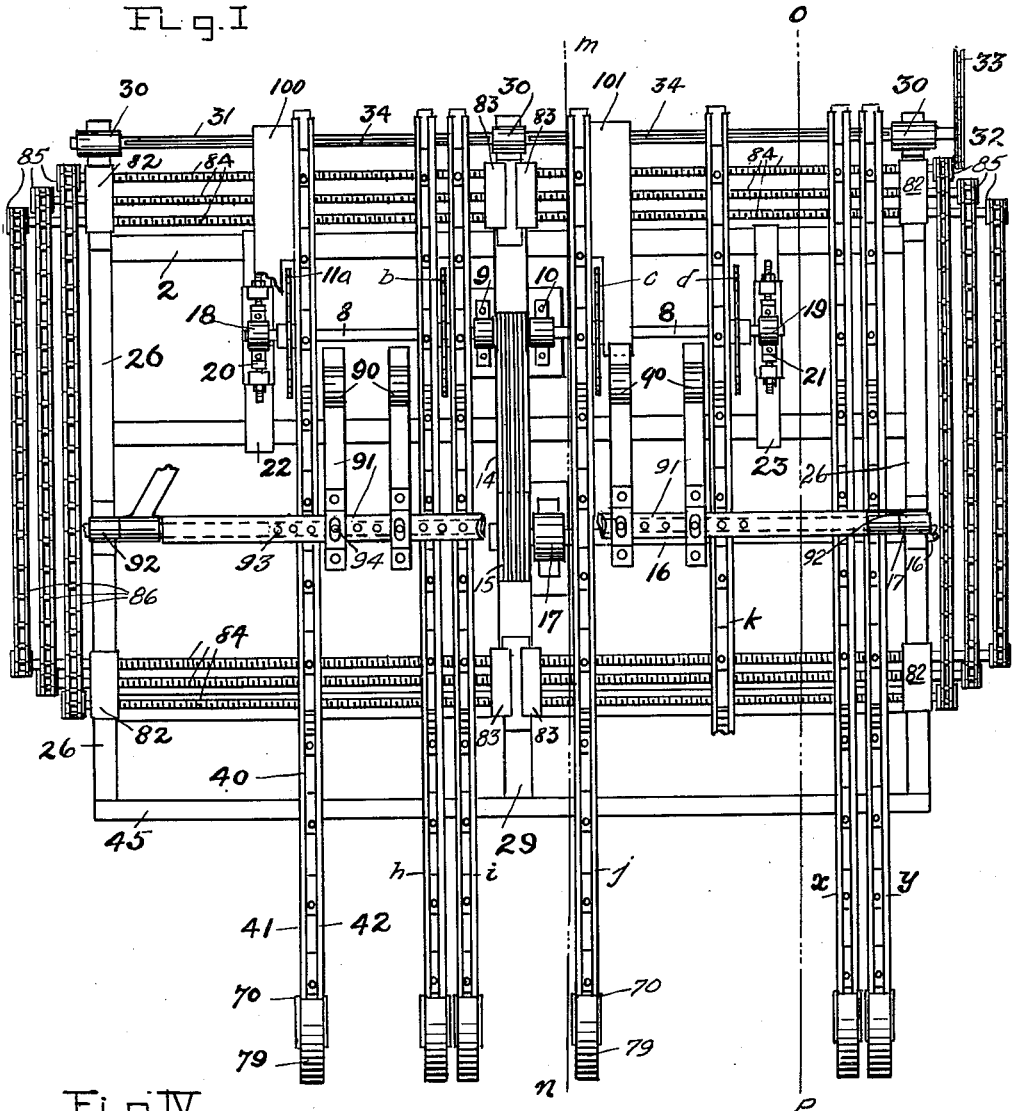
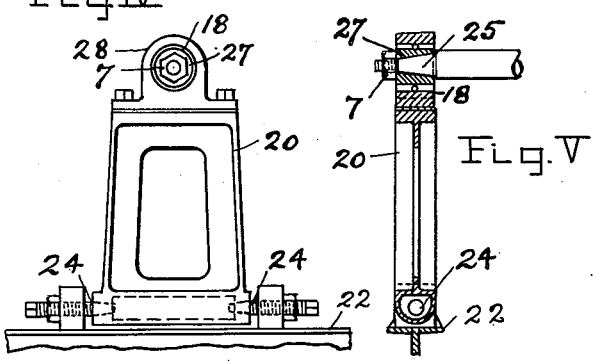
INVENTOR
Allan G. Anderson.
by Arthur Scion
Attorney.

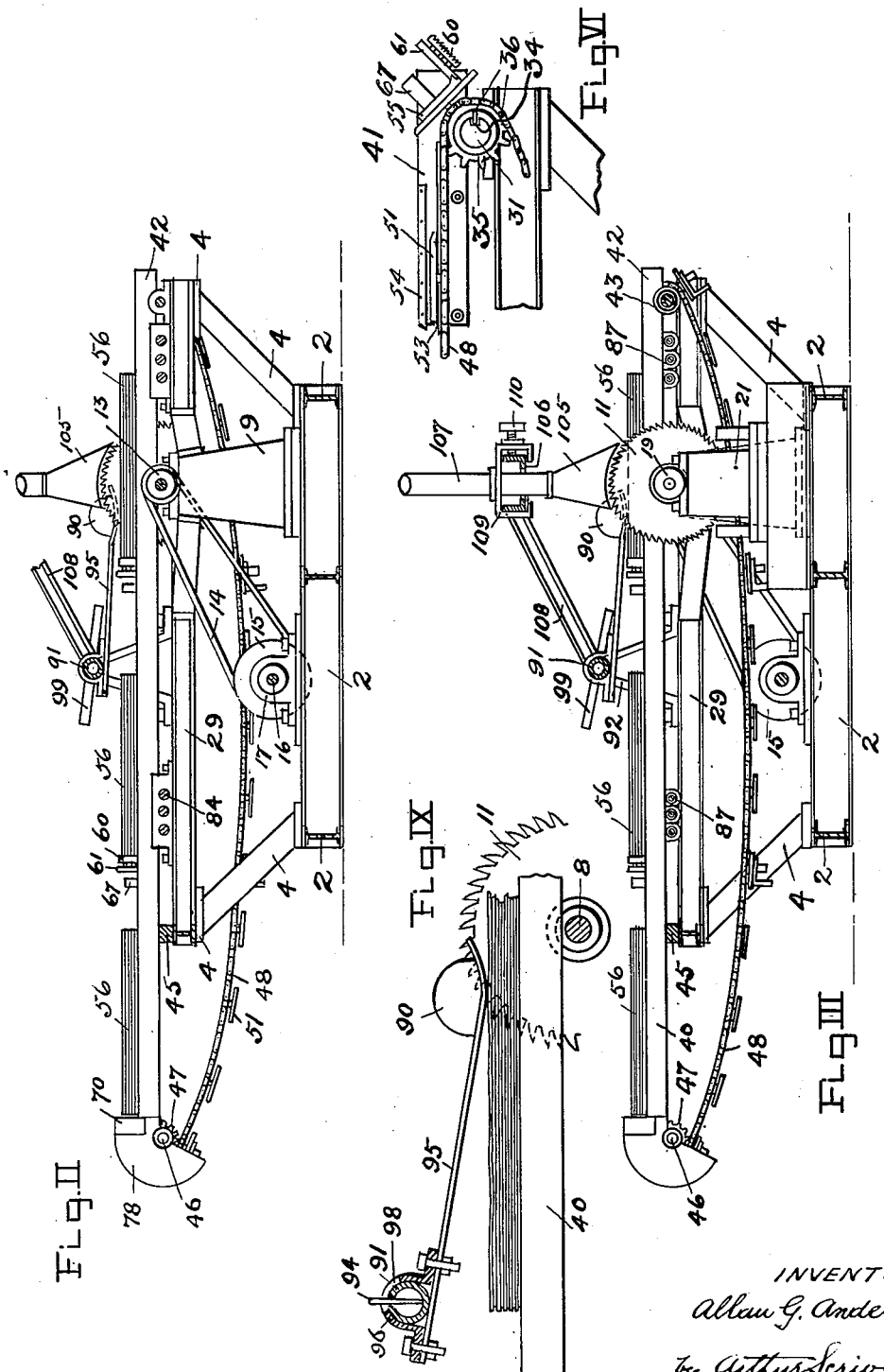

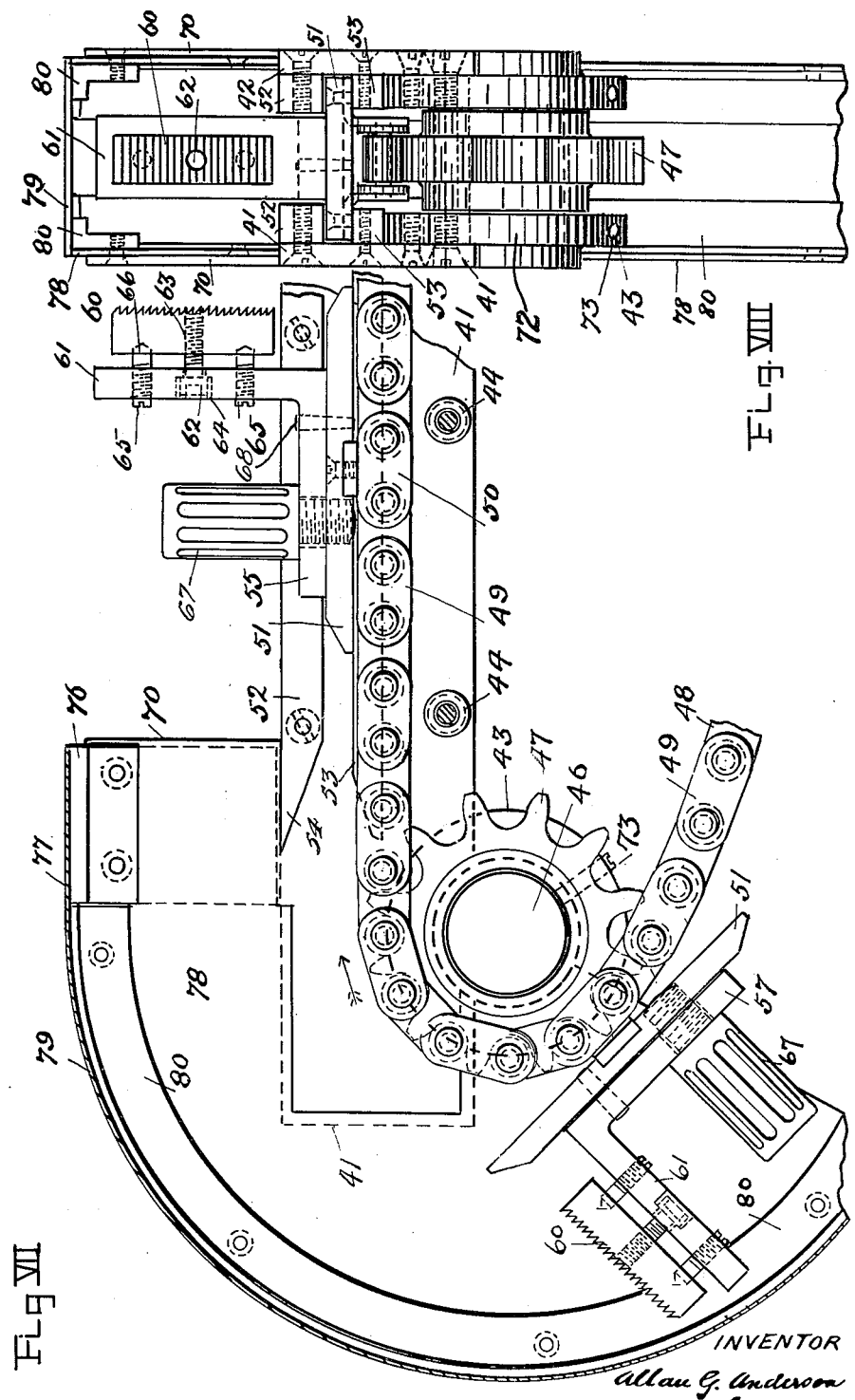

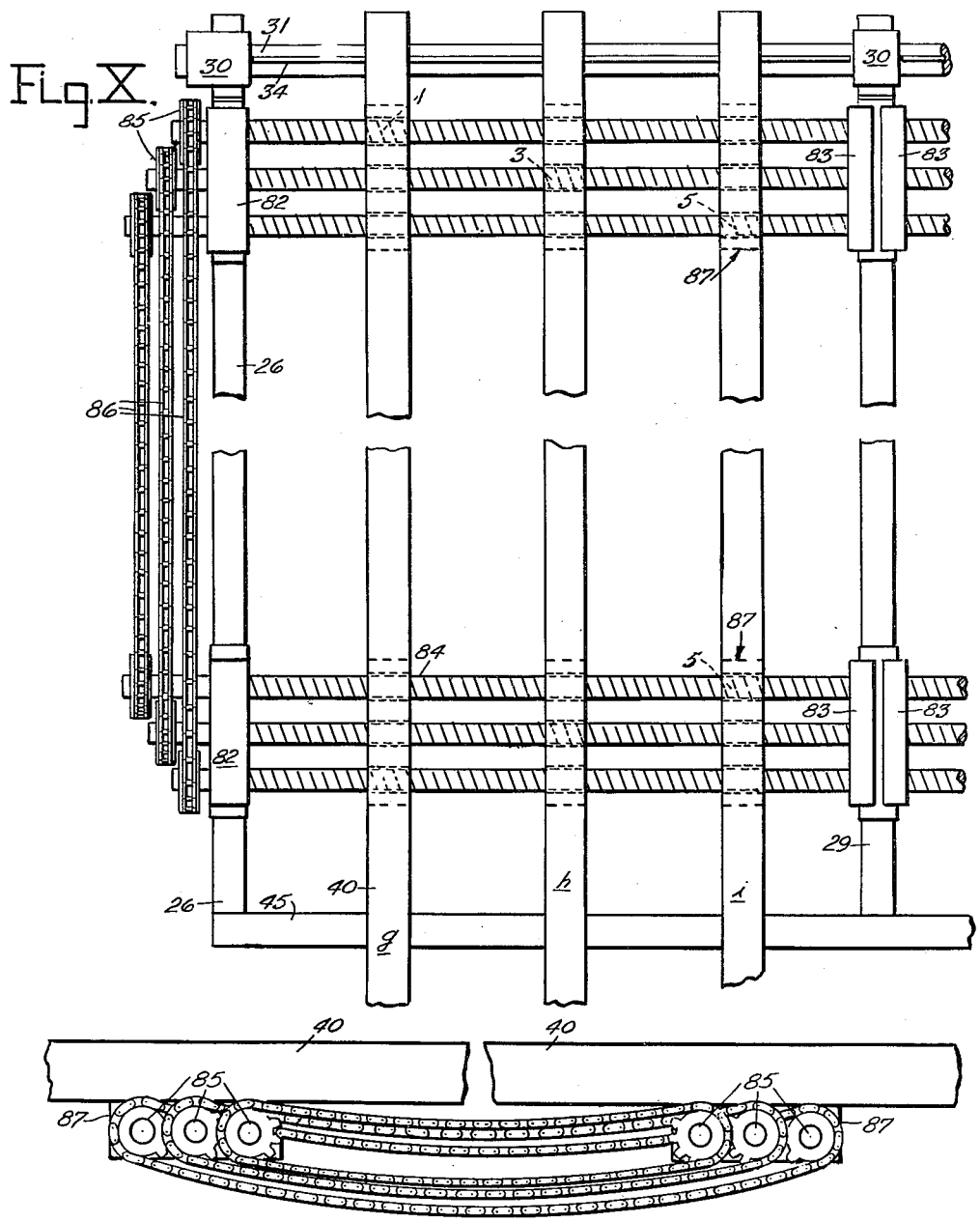

Patented Mar. 21, 1950

2,501,299

UNITED STATES PATENT OFFICE 2,501,299

PANEL TRIMMING MACHINE

Allan G. Anderson, Cheraw, S. C., assignor of one-half to William G. Anderson, Cheraw, S. C.

Application October 5, 1944, Serial No. 557,343

16 Claims. (Cl. 143—37)

My invention relates to machines for trimming and squaring the ends and sides of sheets of fibrous material, and particularly to machines for trimming panels of plywood.

The objects of my invention are to produce a simple and an efficient machine for the purpose; a machine in which the panels of plywood are conveyed in a direct line to the trimming mechanisms; a machine which may be operated mechanically with a minimum of risk to the life and limb of the attendant; a machine in which the conveying mechanisms and the trimming mechanism may be accurately adjusted, and quickly changed from the adjustment for one size of panel to that of another size.

My machine comprises, broadly, a foundation framing, preferably of steel beams and plates; conveying means consisting of parallel bars providing chain races for conveying chains, and adjustable laterally to form an adjustable table for the support of the panels to be trimmed; conveying chains having rapidly adjustable dogs for the squaring of the material on the table and moving it to the trimming means; the trimming means, consisting of circular saws, so arranged that they may be quickly rearranged as to spacing for panels of different lengths and widths; and exhaust means by which debris and dust is conveyed from the machine so completely and rapidly as to minimize the risk of fire, and of the fouling of the machine.

In the drawings, Figure I shows my machine in plan; Figure II is a longitudinal section on line m—n in Figure I; Figure III is a longitudinal section on line o—p in Figure I; Figure IV is a detail of a bearing in side elevation; Figure V is a vertical cross section of the same detail; Figure VI is a detail of the conveyor-chain drive in side elevation; Figure VII is a detail showing the panel feed-end of the conveyors in side elevation; Figure VIII is an end view of Figure VII; Figure IX is a detail of the means for holding down the work as it goes through the saws, in side elevation, and partly in section.

In Figure X there is shown diagrammatically a part of the screw means for adjusting the conveyors shown in Figure I. In Figure XI is shown an end view of what is shown in Figure X. In Figure XII is shown a detail of the adjusting means.

In Figures I, II, and III the numeral 2 indicates the steel-framed foundation for the working parts of the machine; and the numeral 4 indicates legs and plates which support upper parts of the machine frame.

A saw mandrel 8 is mounted in bearings 9 and 10; and on it are spaced the circular saws 11, indicated in Figure I, separately, by the letters a, b, c, and d. A machine arranged for using four saws is shown; but a machine for more or less saws can be built and operated in the same manner as the machine for four.

On the mandrel 8 and between the bearings 9 and 10 is a driven V-belt pulley 13. This pulley and the saw mandrel 8 are driven through the V-belts 14 by the larger pulley 15, carried by the motor shaft 16, supported in bearings 17. The motor by which the pulley 15 is driven is outside the frame of the machine, and it is not shown in the drawings.

The arrangement of the saw mandrel 8 and its support is an important feature of my invention. For operating reasons the saw mandrel is mounted below the level of the material to be trimmed and consequently below the conveyors upon which the material is moved towards the trimming means. The two ends of the mandrel 8 are supported in bearings 18 and 19, which are mounted on pedestals 20 and 21, respectively; and which pedestals stand upon accurately leveled bases 22 and 23. These bases, 22 and 23, are on a level below the saws and below the chains. In the claims, for the sake of brevity, I speak of the pedestals being "based"—that is, set on a base—at a level below the level of the saws and the chains. I do not confine myself to the exact means shown for the support of the mandrel 8, as there are other forms of bearing and of drive which can be efficiently used. In the trimming of panels of plywood it is necessary to remove saws at intervals of about four hours for sharpening. The blunted ones are removed, and are immediately replaced by saws already sharpened. Much plywood is ordered in car lots by manufacturers of boxes and of furniture, who order various sizes of panels to meet their requirements. To fill these orders the saws may have to be shifted, adjusted, and even changed many times a day. From the time the machine is stopped for the removal or the adjusting of saws to the resumption of panel trimming it is shut down. Production ceases; overhead expense continues; as does the cost of unproductive labor. Therefore it is most important to save time in making the frequent and necessary changes. With this machine, and with my special provisions for the rapid changing of the saws, all the necessary operations can be quickly made by the machine operators.

Note that the length of the saw mandrel 8 (Figure I) is much less than the width of the frame of the machine between the side beams 26, which are substantially on a level with the mandrel. And also note that the bar and shaft supports of the conveyors are longer than the mandrel; so, obviously, the conveyors may be moved along the conveyor supports to positions beyond the ends of the mandrel. The space between the side beams and the ends of the mandrel is not only provided for the removal of saws; as will be presently seen. In order to change saws or to remove a saw from the mandrel on either side of the central bearings 9 and 10, the end bearing on that side must first be removed. The central bearings are not disturbed. If only the spacing between the saws on either side of the central bearings is to be adjusted, this is done by opening and moving the split collars which hold the saws in place on the mandrel. The outer bearings 18 and 19 are not disturbed.

But when saws are to be removed from the mandrel for sharpening, or are to be placed upon it, and when it is necessary to move a chain-conveyor beyond the end of the mandrel, it is not enough to remove the end bearings 18 and 19. I remove at the same time the pedestals 20 and 21 upon which the bearings are mounted. To simplify the readjustment of the bearings and pedestals I do not detach the bearing from the pedestal, but I remove them together. The adjustment of the bearing may be provided between pedestal and base and also between pedestal and bearing block. For rapid removal the pedestal may be held in alignment by means of dowel-pins, and the pedestal held down on its base by means of a quick-acting bolt; but I prefer the method of mounting the pedestals shown in Figures IV and V; wherein the ends of the saw mandrel 8 are tapered at 25 to fit the tapered bushings 27 in the bearings 18 and 19; the said bushings being a running fit, with or without ball-bearings, in the housing 28. The tapered end 25 of the mandrel 8 is held in the bushing 27 by the nut 7. This construction admits of rapid removal of the bearing from the mandrel by removing the nut 7, and then swinging the bearing with pedestal downward on the pivots 24. Replacement of the bearing is as rapid. The pivots 24 are adjustable on a line normal to the axis of the bearing and mandrel. The pitch of the taper at 25 is such that when the pedestal 20 is swung down on pivots 24, the tapered inner surface of bushing 27 leaves the tapered surface of the end 25 of mandrel 8 at once and freely. There is no downward pressure by the bushing on the end of the mandrel when the pedestal 20 is swung down, for the taper is so shaped that its upper profile will lie within an arc described with pivot 24 as center, and radius from the said center to the point on the top of the mandrel where the taper begins.

Supported on the side beams 26 and on a central beam 29 are bearings 30 which carry the drive shaft 31. This shaft 31 is driven by a motor, not shown, through the sprocket 32 and chain 33. The shaft 31 is grooved from end to end by a keyway 34 (Figure VI). Strung upon the shaft 31 are a number of driving chain-sprockets 35, each one provided with a feather-key to run smoothly in the key-way 34; so that, while the shaft drives the sprocket, the said sprocket is free to be moved along the shaft 31.

The chain-conveyor 40 is built up of two parallel bars 41 and 42; to each of which is attached a collar 43. This collar is bored a running fit for the shaft 31. The two side bars 41 and 42 are spaced apart in parallel throughout their length by suitable means such as distance pieces 44 shown in Figures VII and VIII.

Between the bars 41 and 42 of each conveyor 40, on shaft 31, and so between collars 43 attached to said bars, is mounted the driving sprocket 35, which is rotated by the feather-key 36 engaging in the key-way 34 in shaft 31, Fig. VI.

This end of the machine is that end from which trimmed panels of plywood are discharged. It is also the end from which the sprockets 35 drive the conveyor chains which run in the conveyors 40.

The conveyors 40 are supported adjacent the centers of their length by the cross-bar 45 (Figs. I, II, III) on which they can slide between the sides of the machine and its center. This end of the machine I will refer to as the feed end.

The feed ends of the conveyors 40 extend beyond the cross-bar 45; so that working space may be left between them for the operators. Between each pair of bars 41 and 42 at this feed end of the conveyors, Fig. VII, there is mounted, to revolve freely on a stub-shaft 46, a sprocket idler 47. Each pair of sprockets—the driver 35 and the idler 47—carries a substantial roller conveyor chain 48. This chain is made up of links 49, with attachment links 50 at intervals. I show a chain link of one inch pitch; and I have shown an attachment link as each twelfth link. The object of spacing the attachment links so closely is that I may have a large choice of links to which attachments may be made. The spacing may be made even less than one in twelve if desired. Referring to Figures VII and VIII in which the chain 48, sprocket 47, and bars 41 and 42 are shown to a larger scale: on each attachment link 50 there is securely mounted a plate 51, having a width sufficiently less than the space between the bars 41 and 42 of the conveyor 40 that it may run between them without unnecessary freedom or unnecessary friction. The plate 51 is secured to the link 50 at the midle of its length so that it may follow and turn with the chain 48 around the sprocket 47. In Figure VIII I show an end elevation of the detail shown in Figure VII. The two bars 41 and 42 are, as I have said, held parallel with one another by distance pieces 44. Along the inner faces of the bars 41 and 42, and extending from a point near the feed end to a point near the delivery end of the conveyor, are the two guide strips 52, secured by means of screws or other suitable means to the said bars. Below the strips 52, at a depth slightly more than the thickness of the plates 51, is secured a second pair of guide strips 53; also extending from a point near the feed end to a point near the delivery end of the conveyor. When the chain 48 is in motion, as each plate comes up over the idler sprocket 47 it enters between the ends of the strips 52 and 53, and then slides forward on the strips 53, while it is prevented from lifting or tilting by the guide strips 52. The chain itself, attached by its attachment links 50 to the plates 51, is also supported on the guide strips 53, on which the plates 51 slide. The strips 52 are chamferred at the end 54 (Fig. VII) to allow the smooth and sure entry of the forward end of the plates 51. It has now been explained how the pair of bars 41 and 42 form a race for the chain 48, and how the movement of the chain 48 along this race-way is controlled, and how the dog-plate 51 is prevented from tilting while passing from the feed end of the machine to the discharge end. Hereinafter I will identify the plate 51 as the dog-plate.

Upon a selected dog-plate 51 on a chain 48 I fasten a dog 55, whose function it is to drive an untrimmed plywood panel placed upon the tops of the conveyors 40 towards the trimming means, in this case the circular saws 11. Panels so placed are shown at 56 in Figures II and III. The foot of the dog 55 is below the level of the top side of the conveyor bars 41 and 42; so that the conveyor table may be as clear of useless obstructions as possible. In Figure VII I show a dog 55 on the upper part of chain 48, attached to a dog-plate 51; and rounding the idler sprocket 47 I show another dog 57, also attached to a dog-plate 51. The chain is moving in the direction indicated by the arrow. In actual practice these two dogs 55 and 57 would be much farther apart, the distance being governed by the dimensions of the panel of plywood to be trimmed. This is seen in Figs. I, II and III. In Figure VII I have shown two dogs on two adjacent dog-plates 51 only to show them in the same figure: dog 55 on the level chain, and dog 57 passing around the sprocket idler 47.

The dog 55 is specially designed for accurate adjustment and alignment with dogs on other conveyors on the machine. This is an important feature; for if the dogs are not squared up the trimming of the panels will not be square, and material will be lost.

Referring to Figure VII: the dog 55 drives the work forward by the toothed part 60; referred to hereinafter as the tooth. Instead of using teeth on the driving surface of the piece 60, the said surface may be made uneven or rough so that it may hold the edge of the panel from slipping upward or sideways. As the dog advances with the chain 48 the tooth engages the side or the end of a panel of plywood (Figures II and III). This engagement helps to hold the panel down as it passes the saws. The tooth 60 is carried on the upright leg 61 by the screw 62 which engages a threaded hole 63 located intermediate the ends of the said tooth 60. The screw 62 is free to turn in the seat 64 in the leg 61; and upon being so turned it brings the tooth 60 toward or from the leg 61. Above and below the screw 62 are locking pins 65, which are threaded in the leg 61, but which only abut against or enter shallow seats 66 in the back of the tooth 60. The tooth 60 having been adjusted as to its central line, the two locking pins 65 are then adjusted to bring the tooth 60 to a vertical position and to lock it in that position. The adjustment of the tooth 60 is important, so that the driving edge or rear of the panel may be held square with the conveyors while passing through the saws. The dog-plates 51 are drilled in a jig so that all shall be practically alike The dog 55 is secured on the dog-plate 51 by means of the hand-screw 67, and it is held in alignment with the dog-plate 51 by a dowel pin 68 or by a tongue and groove.

At the feed end of the bars 41 and 42, at a point thereon slightly forward of that at which the dog-bracket 61, after rising around sprocket 47, has reached a vertical position, and has begun its forward motion along the said bars, I weld or otherwise secure gauge-plates 70, which are squared with the direction of motion of the conveyor chains. The forward edges of all of the gauge plates are set at the same distance from the centers of the chain-driving sprockets 35. All gauge plates are therefore in line with one another, and afford a gauge against which a panel of plywood may be set when it is placed upon the machine. This is especially important when the edge placed against the gauge is an already trimmed side of the panel; for if the panel is not then squared it will probably start on a skew, and so pass through the saws. A panel so squared is shown in Figures II and III. The toothed faces of the dogs are lined up with these gauge plates.

In Figure VII the near-side bar 42 of conveyor 40 has been removed so that the details of the conveyor chain may be seen. At this feed end of the bars of the conveyor there is welded or otherwise secured to their under sides a collar 72, bored to take the stub-shaft 46, on which the idler sprocket 47 is free to revolve. The stub-shaft is held in place by set screws 73.

At the top of each gauge-plate 70 is secured a bracket 76; and to this bracket is secured a detachable hood 77, made of sheet metal or of other suitable material. This hood consists of the two side pieces 78 and of the scroll 79, both being reenforced for strength and stiffness by angles 80. The lower end of the hood may be conveniently secured to the collar 72, if such support is needed. The side plates 78 and the scrolls 79 of the hoods, and the plates 70, are made of substantial material and are strongly constructed because the rough panels are frequently rested upon them, and are slid off them onto the conveyors. The hood is a necessity; for the machine is not necessarily stopped when adjusting conveyors, nor when placing panels in position to be trimmed; and the hood is then a protection to the operator against contact with a rising chain and dog at the end of the conveyor. The vertical gauges 70 are actually the forward pillars of the arch formed by the mouth of the hood.

Secured on the side frames 26 of the machine, Fig. I, are bearings 82; and secured to the central beam 29 are bearings 83. In these bearings are mounted the square-thread screws 84, which pass through the bearings 82 and carry at their outer ends the chain-sprockets 85. On each side of the machine at the feed end there are also three screws 84, with their three sprockets 85. Each screw with its sprocket at one end of the machine is paired with one of the screws and its sprocket on the same side of the machine and at the other end of the machine. Each pair of sprockets is connected by a chain 86, so that whatever movement is imparted to a given screw will, through the medium of the chain and the two sprockets impart the same motion to the other screw of the pair. The chains may be simply pulled by the hand; but a finer adjustment can be made by squaring the ends of the screws 84, and by applying a box-wrench to the squared ends. The screws 84 are so mounted that they are at an angle of 90 degrees with the direction of motion of the chains. This is important; to preserve the squareness of the setting of the machine, and of the trimming done by it.

On the underside of each pair of bars 41 and 42 there are attached the nut-blocks 87, see Fig. III; each one adapted to engage the thread of one of the screws. For structural reasons I find it well to support the screws at each conveyor. Through each one of the blocks there is bored one hole for each one of the screws in a group; in the machine illustrated—three screws. Therefore in each block there are three borings. These nut-blocks 87 may be made in one piece with three bores; or in three pieces each with one bore. It is a question only of ease in manufacturing and assembling. In each nut-block 87 only one of the three holes is threaded; and that one square-threaded to engage the thread of one of the screws 84. See Figure XII. The other two bores in a block are to a diameter to form bearings for the other two screws of the group. The screws being cut with a square thread: the bored bearings afford a support as they would to a solid rod. The faces of the threads being flat: they have no cutting action, as a V thread would have, upon the surface of the bearing. Referring to Figures X, XI, and XII: if we indicate the three bores of each of the nut-blocks as Nos. 1, 3, and 5; then if the first bore in the block on the feed end of the first conveyor is threaded, the bore carrying the connected rod at the delivery end of the first conveyor is also threaded. See Figure X. Bores 3 and 5 in these two blocks will be bored to support the other two screws. At the next conveyor the bores 3 will be threaded, and bores 1 and 5 will be bored to form bearings for the other two screws. At the third conveyor the bores 5 will be threaded, and bores 1 and 3 will be bearings for the other two screws. So, when a chain is pulled and a screw is rotated, its mate at the other end of the machine is also rotated; and this pair of screws will move the conveyor to which they are geared towards or from the center of the machine. The two screws being of the same pitch, the two ends of the conveyor are moved at the same speed, and the conveyor will retain its parallelism with the center line of the machine.

As shown in Figure I: there are two conveyors between saws a and b; one conveyor between saw b and the central bearing 9; one conveyor between central bearing 10 and saw c; and two conveyors are shown over at the extreme right of the machine. Conveyor k is shown adjacent a saw d, to indicate that the full sawing capacity of the machine extends from outer bearing 18 to outer bearing 19. This conveyor is shown broken at one end as it is only shown to indicate relative position. The machine is actually set to cut into two parts and to trim at the same time one large panel which would lie on conveyors g, h, i, and j. If conveyor k was also in use the setting would be for cutting into three panels, and also for trimming a panel of the full capacity of the machine.

If we merely want to change the adjustment of the saws we slacken the fastenings of the split collars holding the saws in position on the mandrel 8, and then adjust the saws, moving the conveyors to suit. But if we wish to add saws or to remove saws for sharpening—let us say on the left hand side of the machine—we first remove the nut 7 from the end of the mandrel 8 (Figs. IV and V). Then we swing the bearing 18 with its pedestal 20 to the left, on the pivots 24. Now we can remove saw a from the mandrel. To remove saw b we clear conveyors g and h from its path. Conveyor g is moved to the left side of the machine by turning the pair of screws 84 which are geared to this conveyor. The two elements indicated by the numeral 90 now obstruct the passing of the saw b and conveyor h. They are moved from the path of the saw and the conveyor in a manner to be described hereinafter. Now turning the screws 84 which are geared to conveyor h we run this conveyor over to the left hand side of the machine and alongside conveyor g. Saw b can now be removed from mandrel 8. The two conveyors g and h will now be in a position on the left hand side of the machine similar to that of the two conveyors x and y shown on the right hand side of the machine. If we wish to we can also run conveyor i over to the left hand side of the machine. The mandrel on the left hand side of the central bearing 9 is now clear; and we can rearrange the saws and the conveyors. The space between the end of the mandrel 8 and the side frame of the machine, 26, is sufficient to accommodate all the conveyors, in this case three, lying side by side, and also to leave working room for the removal of saws. The saws and conveyors on the right hand side of the machine are manipulated in the same manner as that just described. The machine can be set to handle large panels in series, the trimming of the smaller sections being done on a second machine; and the machine may also handle panels of considerable size on one side of the center while on the other side the sections are trimmed. The sections are the smaller panels into which a large panel is cut. The term is used to distinguish between them in this specification.

When a panel is placed on the machine it is squared up against the gauge-plates 70 at the feed ends of the conveyors. The dogs 55 on the conveyor chains 48 will drive the panel through the saws; the dog-tooth 60 holding down the rear end of the panel. The panel sections will be discharged over the delivery end of the machine. The dog-teeth 60 hold down only the rear end of the panel. The panel is held down in the vicinity of the saws by the hold-downs 90 already referred to, and which are substantial weights, swung on a shaft 91, which is carried in bearings 92; see Fig. III. For the shaft 91 I prefer to use a straight piece of wrought iron or steel pipe of any suitable cross-section. This shaft has drilled in it a series of holes 93, Fig. I, large enough to take a pin 94 ob substantial size and strength; (see Figure IX). These holes 93 may be spaced apart at one inch more or less. Attached to the shaft 91 are heavy straps 95, preferably of steel, secured to the shaft by the yokes 96, and carrying at their farther ends the heavy weights 90. The yokes 96 are not tight upon the shaft 91; but are free to be turned on or slid along the shaft.

In the top of the yoke 96 is a slot 98, large enough to take the pin 94; and so positioned that when the weighted end of the strap 95 is lowered to the level of the top of the conveyors 40, the pin 94 will be near the farther end of the slot 98. Then, since the slot has length, it will be seen that the weighted end of the strap 95 may be lifted from the conveyor-bed of the machine; and that its lift will be limited only by the length of the slot 98. I prefer to make the slot of such a length that the weighted arm may be raised to a position a little beyond the vertical before the metal at the end of the slot comes into contact with the pin. When so raised the bed of the machine is clear for the work of changing saws, and the adjusting of saws and conveyors to the panels to be trimmed.

The weighted end of the strap lies on and holds down the panel being processed as it encounters and as it passes through the saws; and the said weighted end of the strap will be free to rise and fall as the somewhat uneven surface of a newly made panel passes beneath it; but always bearing down on the panel with a constant pressure, which is superior to that which may be exerted by the human hand when used to control the movement of the panel. The weighted straps are automatically adjustable to the thickness of the panel.

To lift the weight 90 from the work, or to lift it from the path of saw and conveyor when rearranging the setting of the machine as described hereinbefore: the shaft 91 is rocked or rotated in its bearings 92 by means of the handle 99 (Figures II and III). Looking at Figure IX: we rock the shaft 91 anti-clockwise; the pin 94 engages the left hand end of the slot 98; and, continuing the anti-clockwise movement of the shaft 91, the weighted end of the strap 95 will be lifted.

The object of the series of holes 93 in shaft 91 is that the positions of the pins 94 may be changed; and likewise the positions of the straps 95 to agree with the settings of the saws.

The hold-down arms 95 are shown in the drawing (Fig. IX) yoked to the shaft 91 by the yoke 96. This construction makes easy the removal from the machine of any one of the hold-down arms without disturbing a bearing holding shaft 91.

When we trim a panel of plywood it is often the case that a narrow strip is sawed from the edge; and such narrow strips are apt to fall from the saw-table, in this case consisting of the conveyors, and to gather around the moving parts of the machine and to interfere seriously with their operation. Taking the first three saws a, b, and c, in Figure I, as being arranged to cut a large panel into two smaller panels, and at the same time to trim the outside edges of the said smaller panels, the trimmings would fall into the machine bed if not supported on and discharged from the strip-tables 100 and 101. The strip-table 100 is broken to show the mandrel bearing 18 beneath; but the strip-table 101 is shown in full length, extending from the end of the machine back to and beyond the center of the saw c. These tables are made right and left, to be attached to the side bars 41 and 42 of the conveyors 40. I prefer to make my tables of sheet metal with a downward extending flange, by which flange the table is secured, with screws (one to a table), to the side of the conveyor bar. These conveyor bars are drilled and tapped on both sides so that any one may have attached to it either a right hand or a left hand table. The holding screw is placed near one end of the table-flange, and the other end of the flange rests on a lug. The table can be removed or placed very quickly.

In Figures II and III an exhaust hood 105 is shown over one of the saws. The spacing of these hoods is adjustable to agree with that of the saws. A frame or bottomless tray 106 is formed of light angles. It is long enough to extend over the full length of the saw mandrel 8; and it is wide enough to allow the exhaust branch-pipe 107 to pass downward between the side angles, as shown.

The tray 106 is supported on arms 108, springing from the side beams 26 of the frame of the machine; and which for convenience are made a part of the bearing-brackets 92.

In Figure I the tray 106 and its supporting arms 108 are not shown, as they would hide the details of the machine below. They are shown in Figure III.

The exhaust hoods 105 and the branch pipes 107 are supported on the trays 106 by means of the movable clamps 109, which are shown held in position by locking-screws 110, or by any form of quick acting cam-lock. To shift the position of an exhaust hood the appropriate clamp is loosened, and is slid to the desired new position, when the clamp is again locked in place.

Exhaust hoods are also arranged below the saws.

The saws 11 and the conveyors 40 may be arranged in like numbers on each side of the center line of the machine, with the saw mandrel pulley on the center line, as shown in the drawings; but for special purposes a machine may be built to have the driving pulley off center; for instance, so that a saw might be located on the center line, to cut in halves large panels of plywood extending across the frame of the machine.

In the drawings showing the conveyor chains 48 it will be noted that the lower part of the chain hangs well below the conveyors, and also below the bearings 18 and 19. It is for this reason also that the pedestals 20 and 21 are moved with bearings 18 and 19, respectively, when a conveyor is to be run to the side of the machine.

In the claims "conveyor" signifies a conveyor, complete with two side bars, chain, driving dogs, chain driving sprocket, and chain idler sprocket. "Conveyor bars" signify the side bars of each "conveyor."

I claim:

1. In a panel trimming machine: the combination of endless chain conveyors arranged in parallel; each conveyor having an endless chain adapted to travel from its work-feed end to its work-delivery end, an idler sprocket and a driving sprocket supporting the chain at either end of the conveyor; means for rotating the driving sprockets synchronously; vertical work gauges erected on the work-feed ends of the conveyors, their forward edges being set at one and the same distance from the centers of the driving sprockets; and dogs attached to the chains to engage and drive the work on the conveyors, each of said dogs having a vertically disposed work-driving member adjustable in a vertical plane to align with the said work gauges.

2. In a panel trimming machine, the combination of parallel conveyor supporting-bars; a conveyor supported by and normal to the said supporting bars, the conveyor comprising a pair of side-bars spaced apart, an endless chain adapted to move lengthwise of and between the side-bars, dogs attached to the chain to engage and drive the work, each of the said dogs having an upstanding post supporting a work-driving member adjustable to and from the post for alignment with a work-driving member on another conveyor, and also adjustable as to its inclination to the horizontal in a vertical plane parallel to the direction of motion of the chain; and means for driving the chain.

3. In a panel trimming machine, the combination of parallel conveyor supporting-bars; a conveyor supported by and normal to the said supporting-bars, the conveyor comprising a pair of side-bars spaced apart, an endless chain adapted to move lengthwise of and between the side-bars, dogs attached to the chain to engage and drive the work, each of the said dogs having an upstanding post supporting a work-driving member adjustable to and from the post for alignment with a work-driving member on another conveyor, and as to its inclination to the horizontal in a vertical plane parallel to the direction of motion of the chain, and having along its forward driving face teeth adapted to engage and hold the uncut edges of plywood; and means for driving the chain.

4. A panel trimming machine having in combination parallel side frames; conveyor supporting-bars normal to the said frames; a plurality of conveyors parallel with the side frames, supported on and normal to the supporting-bars, and slidable laterally along the said supporting bars; a pair of square-thread nuts fixed on the underside of each conveyor, one adjacent each end of the conveyor; a pair of square-thread rods to each conveyor, the square thread of each rod engaging in the square thread in a nut attached to the associated conveyor; bearings fixed to the underside of each conveyor to support the weight of unassociated square-thread rods, the said bearings and the said nuts being so arranged that the pair of square-thread rods which move the conveyor to which are secured the associated pair of square-thread nuts, are carried in the bearings secured to the other conveyors; and means for rotating the rods of a pair synchronously.

5. A panel trimming machine having in combination parallel side frames; conveyor supporting-bars normal to the side frames; a plurality of conveyors parallel with the side frames and supported on and normal to the supporting-bars, and slidable laterally along the said supporting-bars; square-thread rods rotatably supported in bearings on the side frames, two to each conveyor; blocks affixed to and spaced apart on the underside of each conveyor, each block bored horizontally with holes in number the same as the number of conveyors, the holes in the blocks under one conveyor being in line with the holes in blocks under other conveyors, and one hole in each block under each conveyor being threaded to engage the square thread of one of the said rods; the other holes in each block under each conveyor being bored horizontally to a diameter to form a movable bearing for the said square-thread rods; and means for rotating synchronously the rods in each pair.

6. A panel trimming machine having in combination a conveyor having two vertical and parallel side-bars spaced apart; channels constructed on the inside faces of the side-bars parallel with and opposite to one another; dog-plates the opposite edges of which are adapted to slide in the parallel channels and between the side-bars; an idler sprocket mounted between the two bars at their free end; a driving sprocket mounted between the two bars at their delivery end; an endless chain attached to the dog-plates, the said chain being supported at the ends of the conveyor bars by the idler sprocket and the driving sprocket, and between the two sprockets being suspended from the dog-plates; means for driving the driving sprocket; and work-pushing dogs adjustably mounted on the dog-plates.

7. A panel trimming machine, having in combination, a saw mandrel rotatably mounted in end bearings; means for rotating the mandrel; a pair of conveyor supporting bars arranged in parallel with and one on each side of and spaced from the mandrel; a pair of saws mounted on the mandrel, and adjustable with respect to each other to the desired finished width of the panel; a pair of chain-conveyors carried on the conveyor supporting bars, and extending transversely of and above the mandrel and between the saws, and adjustable laterally to and from the saws; endless chains carried on the said conveyors and adapted to carry the work to and from the saws; means for operating the chains; transfer means for moving each of said chain-conveyors individually and laterally lengthwise of said supporting bars; and strip-tables attached to that face of each one of the conveyors which is adjacent its associated saw, the said strip-tables each having a projecting table surface extending around the saw, and to a point adjacent the cutting edge of the saw; the said strip-tables being removable from the conveyors to permit free lateral movement of the latter.

8. In a panel trimming machine having a saw-mandrel mounted in bearings, a saw mounted on the mandrel, means for driving the mandrel, and conveyor means to carry the work to the saw: a work hold-down comprising a rotatable cross-shaft mounted in bearings; means for rotating the shaft; pin holes drilled in line in the shaft; pins removably set in the pin holes; straps loosely looped at one end around the shaft, each one extending forward substantially horizontally to a point adjacent and above the mandrel, and carrying adjacent its extended end remote from the cross-shaft a weight adapted to weigh the said end of the strap down upon the advancing work, each one of the said straps having in its looped end a slot cut lengthwise of the strap and loosely embracing one of the said pins, the said slot being so located and of such a length that the weighted end of the strap will ride upon the surface of the work of any thickness that may be cut by the saw, and so that the pin will strike the metal at the forward end of the slot to limit the lift of the weighted end of the strap; and also so located that when the shaft is turned over and away from said weighted end the said pin will strike the metal at the rear end of the slot, and continuing to turn with the shaft will raise and hold the strap and weight from and above the work.

9. A panel trimming machine having in combination a mandrel rotatably mounted in end bearings, one of the bearings being a fixed bearing and the other a removable bearing; means adjacent the fixed bearing for rotating the mandrel; a pair of saws adjustably mounted on and removable from the mandrel and spaced to the desired width of the trimmed panel; conveyor supporting bars disposed paralled to and on either side of the mandrel, and extending from a point adjacent the fixed bearing to and beyond the movable bearing; chain-conveyors carried on the supporting bars and extending transversely of the mandrel and between the saws, and slidable individually and laterally on the said supporting bars; means for so sliding the conveyors on the supporting bars; endless chains carried on the conveyors to advance the work to and beyond the saws, the chains returning from the delivery ends of the conveyors to the feed end of the conveyors partly at a level below the saws; means for operating the chains; the said removable bearing being based at a level below that of the saws and below that of the returning feed chains; and means for removing the bearing so based.

10. In a panel trimming machine and in combination: a saw mandrel having a saw mounted thereon; bearing means for supporting the mandrel at one end thereof; mandrel rotating means adjacent the said bearing means; a removable bearing at the other end of the mandrel; conveyor supporting bars extending in parallel relation to the mandrel and beyond that end of the mandrel which is carried in the removable bearing; conveyors between the saw and the removable bearing and extending transversely of the mandrel to carry the work to and beyond the saw, the said conveyors being individually and laterally adjustable on the supporting bars; the said removable bearing being removably based at a level below the level of the saw and below the level of the conveyors; and transfer means adapted to move the conveyors individually and laterally along the support bars and to positions beyond the end of the mandrel after the removal of the removable bearing.

11. In a panel trimming machine and in combination: a saw mandrel rotatable in end bearings, means for rotating the mandrel; a fixed bearing adjacent the rotating means and carrying one end of the mandrel, the other end of the mandrel being shaped as a cone; saws removably mounted on the mandrel; conveyor support bars located on either side of the mandrel and extending lengthwise of the mandrel and beyond the coned end of the mandrel; conveyors between the saws adapted to advance the work to and beyond the saws and adjustable laterally and individually lengthwise of the mandrel and beyond the coned end of the mandrel; means for so adjusting the conveyors; a bearing pedestal adjacent the coned end of the mandrel, and based at a level below that of the saws and below that of the conveyors; the said pedestal being so pivoted at its base that it may be swung in an arc in line with the mandrel and down to a position below the levels of the saws and of the conveyors; a bearing block mounted on the pedestal; a bearing rotatably mounted in the bearing block, the said bearing being bored with an inner conical surface adapted to fit the conical end of the mandrel, the angle of the cone surfaces to their axes being such that when the bearing is swung away from the mandrel the two cone surfaces will part freely; and removable retaining means for holding the conical end of the mandrel in contact with the inner surface of the bearing.

12. In a panel trimming machine and in combination: a saw mandrel rotatable in end bearings; mandrel rotating means adjacent one of the bearings; a pair of saws adjustably and removably mounted on the mandrel; chain-conveyors extending transversely of the mandrel and between the saws and adapted to be moved laterally and individually in the direction of the axis of the mandrel; endless chains carried on the conveyors and adapted to advance the work to the saws, the said chains returning to the feed end of the conveyors at a level below the mandrel; means for driving the chains; a bearing carrying the end of the mandrel remote from the rotating means, and removably based at a level below that of the saws and below that of the return-chains of the conveyors; and transfer means for moving the conveyors laterally, and beyond the end of the mandrel after the removal of the removable bearing.

13. In a panel trimming machine, and in combination: a saw mandrel rotatable in end bearings; means for rotating the mandrel; a fixed bearing adjacent the rotating means and carrying one end of the mandrel; saws adjustably and removably mounted on the mandrel; conveyors extending transversely of the mandrel and between the saws and adapted to advance the work to the saws and to carry it beyond the saws, the said conveyors being movable laterally and individually in the direction of the axis of the mandrel; a removable bearing carrying the end of the mandrel which is remote from the fixed bearing, the said removable bearing being based at a level more remote from the mandrel than are the conveyors and the saws; and means for adjusting and moving the conveyors in the direction of the axis of the mandrel and beyond the mandrel after the removal of the removable bearing.

14. A panel trimming machine having in combination a saw mandrel supported in a fixed bearing intermediate its ends; mandrel rotating means adjacent the fixed bearing; and on each side of the said bearing saws adjustably and removably spaced on the mandrel, chain-conveyors extending transversely of the mandrel and between the saws and adjustable laterally and individually in the direction of the axis of the mandrel, endless chains carried on the conveyors to advance the work to the saws and to discharge the work beyond the saws, means for operating the chains, transfer means for adjusting the conveyors and for moving the conveyors laterally and individually in the direction of the axis of the mandrel and beyond the end of the mandrel, and a removable bearing supporting the end of the mandrel, the said removable bearing being based at a level below the saws and below the chains of the conveyors.

15. A panel trimming machine having in combination a saw mandrel supported in a fixed bearing intermediate its ends; mandrel rotating means adjacent the fixed bearing; and on each side of the said bearing saws adjustably and removably spaced on the mandrel, chain-conveyors extending transversely of the mandrel and between the saws and adjustable laterally and individually in the direction of the axis of the mandrel, endless chains carried on the conveyors to advance the work to the saws and to discharge the work beyond the saws, means for operating the chains, transfer means for adjusting the conveyors and for moving the conveyors laterally and individually in the direction of the axis of the mandrel and beyond the end of the mandrel, and a removable bearing supporting the end of the mandrel, the said removable bearing being based on a plane more remote from the mandrel than the saws and the conveyors and their chains.

16. In a panel trimming machine, the combination of parallel conveyor supporting-bars; a conveyor supported by and normal to the said supporting-bars; the conveyor comprising a pair of side-bars spaced apart, an endless chain adapted to move lengthwise of and between the side-bars, dogs attached to the chain to engage and drive the work, each of the said dogs having an upstanding post supporting a work-driving member adjustable to and from the post for alignment with a work-driving member on another conveyor and as to its inclination to the horizontal in a vertical plane parallel to the direction of motion of the chain and having a roughened forward driving face adapted to engage the edge of the work, and means for driving the chain.

ALLAN G. ANDERSON.

REFERENCES CITED

The following references are of record in the file of this patent:

UNITED STATES PATENTS

| Number | Name | Date |
| --- | --- | --- |
| 65,274 | Richards | May 28, 1867 |
| 104,068 | Selden et al. | June 7, 1870 |

(Other references on following page)

UNITED STATES PATENTS

| Number | Name | Date |
|---|---|---|
| 369,026 | Parish | Aug. 30, 1887 |
| 525,603 | Horstmeier | Sept. 4, 1894 |
| 537,760 | Dumoulin | Apr. 16, 1895 |
| 602,507 | Kennedy | Apr. 19, 1898 |
| 619,541 | Butterfield | Feb. 14, 1899 |
| 665,022 | Levalley | Jan. 1, 1901 |
| 717,116 | Park | Dec. 30, 1902 |
| 1,060,793 | Segraves | May 6, 1913 |
| 1,431,434 | Tardif | Oct. 10, 1922 |
| 1,552,553 | Georgia | Sept. 8, 1925 |
| 1,600,604 | Sorlien | Sept. 21, 1926 |
| 1,761,096 | Tower | June 3, 1930 |
| 1,795,953 | Johnson | Mar. 10, 1931 |
| 1,846,621 | Tanner | Feb. 23, 1932 |
| 1,847,983 | Rockwell | Mar. 1, 1932 |
| 1,907,564 | Osborn | May 9, 1933 |
| 1,959,667 | Grant | May 22, 1934 |
| 2,160,307 | Cleveland | May 30, 1939 |
| 2,266,847 | Calpha et al. | Dec. 23, 1941 |
| 2,332,654 | Mead et al. | Oct. 26, 1943 |

FOREIGN PATENTS

| Number | Country | Date |
|---|---|---|
| 14,666 | Great Britain | July 10, 1908 |